(12) United States Patent
Wu et al.

(10) Patent No.: US 10,454,112 B2
(45) Date of Patent: Oct. 22, 2019

(54) ANODE AND LITHIUM ION BATTERY EMPLOYING THE SAME

(71) Applicant: Industrial Technology Research Institute, Hsinchu (TW)

(72) Inventors: Wei-Hsin Wu, Hsinchu (TW); Sheng-Hui Wu, Hsinchu (TW); Chi-Yang Chao, Taipei (TW); Kun-Lin Liu, Taipei (TW); Chia-Chen Fang, Taipei (TW)

(73) Assignee: INDUSTRIAL TECHNOLOGY RESEARCH INSTITUTE, Hsinshu (TW)

( * ) Notice: Subject to any disclaimer, the term of this patent is extended or adjusted under 35 U.S.C. 154(b) by 154 days.

(21) Appl. No.: 15/858,543

(22) Filed: Dec. 29, 2017

(65) Prior Publication Data

US 2019/0207222 A1 Jul. 4, 2019

(30) Foreign Application Priority Data

Dec. 28, 2017 (TW) .............................. 106146230 A (51) Int. Cl.
*H01M 4/64* (2006.01)
*H01M 4/62* (2006.01)
(Continued)

(52) U.S. Cl.
CPC ............. *H01M 4/628* (2013.01); *B01J 39/20* (2013.01); *C08F 8/42* (2013.01); *H01M 4/366* (2013.01);
(Continued)

(58) Field of Classification Search
CPC .. H01M 4/628; H01M 4/382; H01M 10/0525; H01M 4/366; H01M 4/622; H01M 2004/027; B01J 39/20; C08F 8/42
See application file for complete search history.

(56) References Cited

U.S. PATENT DOCUMENTS 7,736,809 B2 6/2010 Hwang et al.
7,745,048 B2 6/2010 Hwang et al.
(Continued)

FOREIGN PATENT DOCUMENTS

CN 100474683 C 4/2009
CN 105140449 A 12/2015
(Continued)

OTHER PUBLICATIONS

Taiwanese Notice of Allowance and Search Report, dated Jun. 4, 2018, for Taiwanese Application No. 106146230.
(Continued)

*Primary Examiner* — Cynthia K Walls
(74) *Attorney, Agent, or Firm* — Birch, Stewart, Kolasch & Birch, LLP

(57) ABSTRACT

An anode and a lithium ion battery employing the same are provided. The anode includes a lithium-containing layer and a single-ion conductive layer. The single-ion conductive layer includes an inorganic particle, a single-ion conductor polymer, and a binder. The single-ion conductor polymer has a first repeat unit of Formula (I), a second repeat unit of Formula (II), a third repeat unit of Formula (III), and a fourth repeat unit of Formula (IV)

Formula (I)

(Continued)

-continued

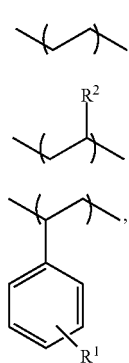

Formula (II)

Formula (III)

Formula (IV)

wherein $R^1$ is $O^-M^+$, $SO_3^-M^+$, $N(SO_2F)^-M^+$, $N(SO_2CF_3)^-M^+$, $N(SO_2CF_2CF_3)^-M^+$, $COO^-M^+$, or $PO_4^-M^+$; $M^+$ is $Li^+$, $Na^+$, $K^+$, $Cs^+$, or a combination thereof; and $R^2$ is $CH_3$, $CH_2CH_3$, or $CH_2CH_2OCH_2CH_3$. In particular, the weight ratio of the inorganic particle to the sum of the single-ion conductor polymer and the binder is from 4:1 to 9:1, and the weight ratio of the binder to the single-ion conductor polymer is from 1:1 to 9:1.

10 Claims, 6 Drawing Sheets (51) Int. Cl.
  *H01M 10/0525* (2010.01)
  *H01M 4/36* (2006.01)
  *H01M 4/38* (2006.01)
  *B01J 39/20* (2006.01)
  *C08F 8/42* (2006.01)
  *H01M 4/02* (2006.01)
(52) U.S. Cl.
  CPC ........... *H01M 4/382* (2013.01); *H01M 4/622* (2013.01); *H01M 10/0525* (2013.01); *H01M 2004/027* (2013.01)

(56) References Cited

U.S. PATENT DOCUMENTS

| | | | |
|---|---|---|---|
| 8,003,252 | B2 | 8/2011 | Jung et al. |
| 8,110,306 | B2 | 2/2012 | Mogi et al. |
| 2005/0089759 | A1 | 4/2005 | Hwang et al. |
| 2008/0131784 | A1 | 6/2008 | Hwang et al. |
| 2008/0248396 | A1 | 10/2008 | Jung et al. |
| 2009/0029261 | A1* | 1/2009 | Thomas-Alyea ..... H01M 2/166 429/248 |
| 2009/0280409 | A1 | 11/2009 | Mogi et al. |
| 2014/0220439 | A1 | 8/2014 | Badding et al. |
| 2015/0056488 | A1 | 2/2015 | Zhang et al. |
| 2016/0240831 | A1 | 8/2016 | Zeng et al. |
| 2016/0329567 | A1 | 11/2016 | Lee et al. |
| 2016/0372743 | A1 | 12/2016 | Cho et al. |
| 2017/0062829 | A1 | 3/2017 | Ryu et al. |

FOREIGN PATENT DOCUMENTS

| | | |
|---|---|---|
| CN | 103874724 B | 10/2016 |
| CN | 106876783 A | 6/2017 |

OTHER PUBLICATIONS

Kazyak et al., "Improved cycle life and stability of lithium metal anodes through ultrathin atomic layer deposition surface treatments," Chemistry of Materials, vol. 27, Sep. 11, 2015, pp. 6457-6462.

Kozen et al., "Next-generation lithium metal anode engineering via atomic layer deposition," ACS Nano, vol. 9, No. 6, 2015 (Published online May 13, 2015), pp. 5884-5892.

Lee et al., "A simple composite protective layer coating that enhances the cycling stability of lithium metal batteries," Journal of Power Sources, vol. 284, 2015 (Available online Mar. 5, 2015), pp. 103-108.

Lu et al., "Stable cycling of lithium metal batteries using high transference number electrolytes," Advanced Energy Materials, vol. 5, 2015 (Published online Feb. 14, 2015), 1402073 (pp. 1-7).

* cited by examiner

ANODE AND LITHIUM ION BATTERY EMPLOYING THE SAME

CROSS REFERENCE TO RELATED APPLICATIONS

The application is based on, and claims priority from, Taiwan Application Serial Number 106146230, filed on Dec. 28, 2017, the disclosure of which is hereby incorporated by reference herein in its entirety.

TECHNICAL FIELD

The disclosure relates to an anode and a lithium ion battery employing the same.

BACKGROUND

Lithium-ion secondary batteries are mainstream commercial products, and they are presently being developed to be lighter either in weight or volume, to have a higher energy capacity and a longer cycle life, and to be safer.

Dendrite growth is a phenomenon that occurs during battery charging, whereby active materials, usually metals such as zinc or lithium, are reduced from their oxidized state and deposited onto a substrate. Depending on the charging conditions, the metal may be deposited a dendritical form, and has the potential to penetrate the separator and then short-circuit the cell, resulting in an explosion which is known as thermal runaway.

Therefore, a novel anode used in a metal-ion secondary battery is required to solve the aforementioned problems.

SUMMARY

According to embodiments of the disclosure, the disclosure provides an anode including a lithium-containing layer and a single-ion conductive layer disposed on the lithium-containing layer. The single-ion conductive layer includes an inorganic particle, a single-ion conductor polymer, and a binder, wherein the single-ion conductor polymer has a first repeat unit of Formula (I), a second repeat unit of Formula (II), a third repeat unit of Formula (III), and a fourth repeat unit of Formula (IV)

wherein $R^1$ is $O^-M^+$, $SO_3^-M^+$, $N(SO_2F)^-M^+$, $N(SO_2CF_3)^-M^+$, $N(SO_2CF_2CF_3)^-M^+$, $COO^-M^+$, or $PO_4^-M^+$; $M^+$ is $Li^+$, $Na^+$, $K^+$, $Cs^+$, or a combination thereof; and $R^2$ is $CH_3$, $CH_2CH_3$, or $CH_2CH_2OCH_2CH_3$. The weight ratio of the inorganic particle to the sum of the single-ion conductor polymer and the binder is from 4:1 to 9:1, and the weight ratio of the binder to the single-ion conductor polymer is from 1:1 to 9:1.

According to other embodiments of the disclosure, the disclosure provides a metal-ion battery, such as lithium ion battery. The lithium ion battery includes a cathode; a separator; the aforementioned anode; and an electrolyte composition. The anode and the cathode are separated from each other by the separator, and the electrolyte composition is disposed between the cathode and the anode.

A detailed description is given in the following embodiments with reference to the accompanying drawings.

DETAILED DESCRIPTION

The metal ion battery described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In the drawings, the size, shape, or thickness of some of the elements may be exaggerated and not drawn on scale for illustrative purposes. The disclosure will be described with respect to particular embodiments and with reference to certain drawings but the disclosure is not limited thereto.

The disclosure provides an anode, which can be applied in power-storage device (such as lithium ion battery). In addition, the disclosure also provides a lithium ion battery including the aforementioned anode. Since lithium exhibits high chemical activity, the lithium-containing compound has potential to form a solid metal film in the organic solvent after reaction. Besides inhibiting dendrite growth, the specific single-ion conductive layer of the anode of the disclosure exhibits superior ion-conductivity and mechanical strength, enhances Coulombic efficiency of the battery employing the specific single-ion conductive layer, and improves cycle life of the battery employing the specific single-ion conductive layer.

Figure 1:
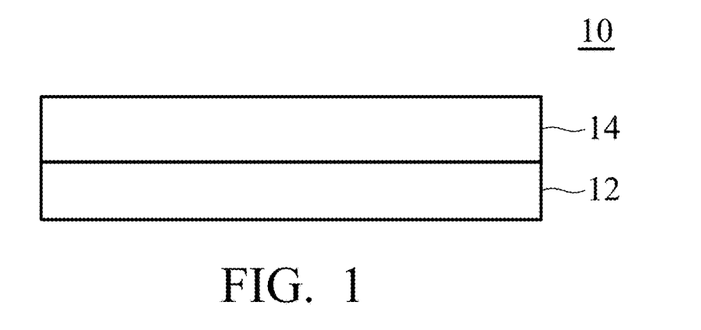
FIG. 1 is a schematic view of the anode according to embodiments of the disclosure.

According to embodiments of the disclosure, as shown in FIG. 1, the anode of the disclosure 10 includes a lithium-containing layer 12 and a single-ion conductive layer 14 disposed on the lithium-containing layer 12. In addition, the anode 10 can further include a current-collecting layer (not shown), and the lithium-containing layer 12 is disposed on the current-collecting layer.

According to embodiments of the disclosure, the anode of the disclosure consists of the lithium-containing layer and the single-ion conductive layer, and the single-ion conductive layer is directly disposed on the lithium-containing layer. In addition, according to embodiments of the disclosure, the anode of the disclosure consists of the current-collecting layer, the lithium-containing layer, and the single-ion conductive layer, wherein the lithium-containing layer is disposed between the single-ion conductive layer and the current-collecting layer.

According to embodiments of the disclosure, the lithium-containing layer can be lithium layer or lithium-containing-compound layer, wherein the lithium-containing-compound layer can be LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, or $Li_{2.6}Cu_{0.4}N$. According to embodiments of the disclosure, the lithium-containing layer 12 can further include mesophase carbon micro beads (MCMB), vapor grown carbon fiber (VGCF), carbon nanotube (CNT), graphene, coke, graphite, carbon black, acetylene black, carbon fiber, or vitreous carbon. According to embodiments of the disclosure, the current-collecting layer can be aluminum foil, or copper foil. According to embodiments of the disclosure, the single-ion conductive layer 14 can include an inorganic particle, a single-ion conductor polymer, and a binder. In addition, according to embodiments of the disclosure, the single-ion conductive layer 14 can consist of the inorganic particle, the single-ion conductor polymer, and the binder.

According to embodiments of the disclosure, the weight ratio of the inorganic particle to the sum of the single-ion conductor polymer and the binder can be from 4:1 to 9:1, such as 5:1, 6:1, 7:1, or 8:1. When the weight ratio of the inorganic particle to the sum of the single-ion conductor polymer and the binder is too low, the single-ion conductive layer exhibits poor mechanical strength, resulting in dendrite penetrating through the single-ion conductive layer. When the weight ratio of the inorganic particle to the sum of the single-ion conductor polymer and the binder is too high, the single-ion conductive layer is relatively brittle and has insufficient flexibility, thereby being unable to inhibit dendrite growth.

According to embodiments of the disclosure, the weight ratio of the binder to the single-ion conductor polymer can be from 1:1 to 9:1, such as 2:1, 3:1, 4:1, 5:1, 6:1, 7:1, or 8:1. When the weight ratio of the binder to the single-ion conductor polymer is too low, the single-ion conductive layer would exhibit high resistance, thereby inhibiting the lithium deposition. When the weight ratio of the binder to the single-ion conductor polymer is too high, the single-ion conductive layer would be unable to effectively inhibit dendrite growth.

According to embodiments of the disclosure, the inorganic particle can be aluminium oxide ($Al_2O_3$), zinc oxide (ZnO), silicon oxide ($SiO_2$), copper nitride ($Cu_3N$), lithium carbonate ($Li_2CO_3$), or a combination thereof. In addition, According to embodiments of the disclosure, the inorganic particle can have an average particle size from 300 nm to 500 nm, such as from 330 nm to 470 nm, or from 350 nm to 450 nm.

According to embodiments of the disclosure, the binder can be polyvinylidene difluoride (PVDF), poly(vinylidene fluoride-co-hexafluoropropene) (PVDF-HFP), polyvinylfluoride (PVF), styrene-butadiene rubber (SBR), nitrile-butadiene rubber (NBR), or a combination thereof.

According to embodiments of the disclosure, the single-ion conductor polymer can have a first repeat unit of Formula (I), a second repeat unit of Formula (II), a third repeat unit of Formula (III), and a fourth repeat unit of Formula (IV)

Formula (I)

Formula (II)

Formula (III)

Formula (IV)

wherein $R^1$ is $O^-M^+$, $SO_3^-M^+$, $N(SO_2F)^-M^+$, $N(SO_2CF_3)^-M^+$, $N(SO_2CF_2CF_3)^-M^-$, $COO^-M^+$, or $PO_4^-M^+$; $M^+$ is $Li^+$, $Na^+$, $K^+$, $Cs^+$, or a combination thereof; and $R^2$ is $CH_3$, $CH_2CH_3$, or $CH_2CH_2OCH_2CH_3$. For example, the single-ion conductor polymer can be lithiated-sulfonated-hydrogenated styrene/butadiene copolymer, lithiated-sulfonated-hydrogenated styrene/ethylene/butadiene copolymer, lithiated-sulfonated-hydrogenated styrene/propylene/butadiene copolymer, or lithiated and sulfonated styrene/ethylene/propylene copolymer. According to embodiments of the disclosure, the fourth repeating unit can be wherein $R^1$ has the same definition as above. According to embodiments of the disclosure, the ratio of the amount of fourth repeating units to the total amount of first repeating units and fourth repeating units can be about from 0.3 to 0.7, such as 0.4, 0.5, 0.6, or 0.65. Namely, the sulfonation degree of the single-ion conductor polymer can be about from 30% to 70%, such as 40%, 50%, 60%, or 65%. According to embodiments of the disclosure, the weight ratio of the sum of the first repeating unit and the fourth repeating unit to the single-ion conductor polymer can be from 0.2 to 0.5, such as 0.25, 0.28, 0.33, 0.36, 0.4, 0.43, 0.46, or 0.49. According to embodiments of the disclosure, the single-ion conductor polymer has a weight average molecular weight (Mw) greater than or equal to 10,000, such as from 10,000 to 200,000, from 20,000 to 160,000, or from 80,000 to 150,000.

According to embodiments of the disclosure, the single-ion conductor polymer can have w first repeating units of Formula (I), x second repeating units of Formula (II), y third repeating units of Formula (III), and z fourth repeating units of Formula (IV)

Formula (I)

Formula (II)

Formula (III)

Formula (IV)

wherein $R^1$, $R^2$, and $M^+$ have the same definition as above; w≥10; x≥10; y≥10; z≥10; and w+x+y+z≥100. According to embodiments of the disclosure, z/w+z can be from 0.3 to 0.7, such as 0.4, 0.5, 0.6, or 0.65. According to embodiments of the disclosure, 650≥w+x+y+z≥100.

According to embodiments of the disclosure, the method for preparing the single-ion conductor polymer can include following steps. First, a polymer is provided, wherein the polymer can have a first repeating unit of Formula (I), second repeating unit of Formula (II), third repeating unit of Formula (III)

Formula (I)

Formula (II)

Formula (III)

wherein $R^2$ has the same definition as above. Next, hydrogen bonded on the benzene ring of the first repeat unit (Formula (I)) of the polymer is subjected to a substitution reaction, resulting in partial of the first repeating units of Formula (I) being transferred to the fifth repeating units of Formula (V)

Formula (V)

wherein $R^3$ is OH, $SO_3H$, $N(SO_2F)H$, $N(SO_2CF_3)H$, $N(SO_2CF_2CF_3)H$, COOH, or $PO_4H$. Next, the result is subjected to a lithiation, resulting in the fifth repeating units of Formula (V) being transferred to the fourth repeating units of Formula (IV)

Formula (IV)

wherein $R^1$ has the same definition as above.

According to embodiments of the disclosure, the polymer can be hydrogenated styrene/butadiene copolymer, hydrogenated styrene/ethylene/butadiene copolymer (such as hydrogenated styrene-ethylene/butadiene-styrene (SEBS) copolymer), hydrogenated styrene/propylene/butadiene copolymer, or styrene/ethylene/propylene copolymer.

According to embodiments of the disclosure, in order to ensure that the single-ion conductive layer exhibits sufficient mechanical strength and superior electrical-chemical properties, the single-ion conductive layer has a thickness about from 2 μm to 6 μm, such as about from 2.1 μm to 5.5 μm, from 2.1 μm to 5.0 μm, from 2.2 μm to 4.5 μm, from 2 μm to 4 μm, from 2.5 μm to 3.5 μm, from 2.6 μm to 3.4 μm, or from 2.7 μm to 3.3 μm. As a result, the anode having the single-ion conductive layer of the disclosure can inhibit dendrite growth, enhances Coulombic efficiency of the battery employing the specific single-ion conductive layer, and improves cycle life of the battery employing the specific single-ion conductive layer.

According to embodiments of the disclosure, the method for preparing the single-ion conductive layer can include following steps. First, a binder and an inorganic particle are dispersed in a first solvent (such as dimethyl ether), obtaining a first solution. Next, the single-ion conductor polymer is dissolved in a second solvent (such as tetrahydrofuran (THF)), obtaining a second solution. Next, the first solution and the second solution are mixed, obtaining a coating composition, wherein the coating composition has a solid content from 5 wt % to 20 wt %, such as 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, or 19 wt %. Next, the coating composition is subjected to a coating process to form a film, wherein the coating process can be screen printing, spin coating, bar coating, blade coating, roller coating, solvent casting, or dip coating. Next, the film is subjected to a baking process (having a process temperature from 50° C. to 160° C., such as 70° C., 100° C., or 150° C.) (when the process temperature is higher than 160° C., the process temperature may exceed the melting point of lithium), obtaining a single-ion conductive layer. According to embodiments of the disclosure, the coating process can be solvent casting, and the thickness of the single-ion conductive layer can be adjusted by means of the solid content of the coating composition.

Figure 2:
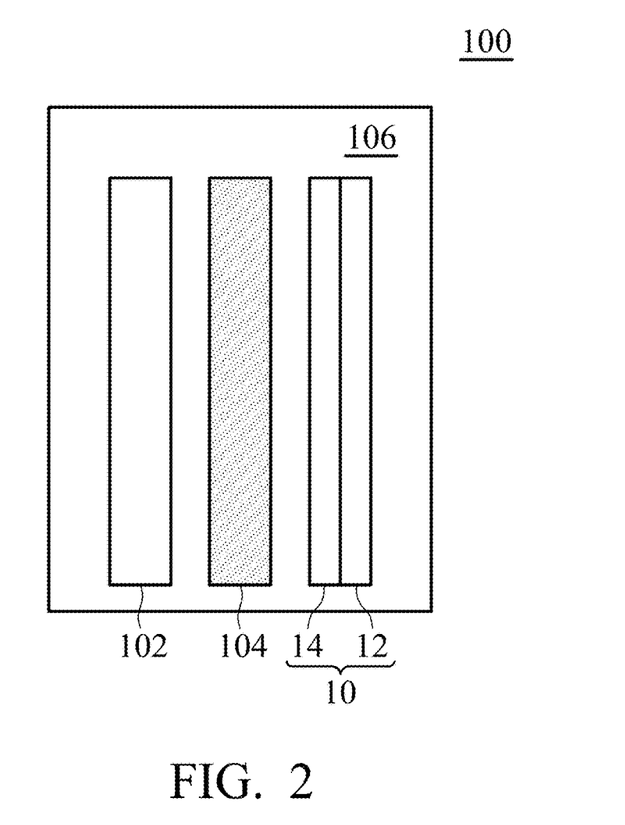
FIG. 2 is a schematic view of the lithium ion battery according to embodiments of the disclosure.

According to embodiments of the disclosure, as shown in FIG. 2, the disclosure also provides a lithium ion battery 100. The lithium ion battery 100 includes a cathode 102, a separator 104, the aforementioned anode 10, and an electrolyte composition 106. The anode 10 and the cathode 102 are separated from each other by the separator 104, and the electrolyte composition is disposed between the cathode 102 and the anode 10. According to embodiments of the disclosure, the separator can have a porous structure. Namely, the separator has a plurality pores uniformly distributed in the separator. The structure stacked by the cathode, the separator, and the anode is immersed in the electrolyte composition. Namely, the battery is filled with the electrolyte composition. According to some embodiments of the disclosure, the single-ion conductive layer of the disclosure can further be disposed between the separator and the cathode.

According to embodiments of the disclosure, the cathode can consist of a cathode material. In addition, according to embodiments of the disclosure, the cathode can include cathode material formed on a current-collecting layer, wherein the current-collecting layer can be aluminum foil, or copper foil. According to embodiments of the disclosure, the cathode material can be lithium, copper, lithium-containing oxide, lithium-containing sulfide, lithium-containing selenide, lithium-containing telluride, lithium-containing phosphide, lithium-containing silicide, lithium-containing aluminide, lithium-containing boride, or a combination thereof. According to embodiments of the disclosure, the cathode material can be Lithium tetrafluoroborate ($LiBF_4$), lithium perchlorate ($LiClO_4$), lithium cobalt oxide ($LiCoO_2$), lithium nickel oxide ($LiNiO_2$), lithium manganese oxide ($LiMn_2O_4$), lithium manganese cobalt oxide ($LiMnCoO_4$), lithium cobalt nickel manganese oxide ($LiCo_{0.3}Ni_{0.3}Mn_{0.3}O$), lithium cobalt phosphate ($LiCoPO_4$), lithium manganese chromium oxide, ($LiMnCrO_4$), lithium nickel vanadium oxide ($LiNiVO_4$), lithium manganese nickel oxide ($LiMn_{1.5}Ni_{0.5}O_4$), lithium cobalt vanadium oxide ($LiCoVO_4$), or a combination thereof.

According to embodiments of the disclosure, the separator includes insulating material, such as polyethylene (PE), polypropylene (PP), polytetrafluoroethylene film, polyamide film, polyvinyl chloride film, poly(vinylidene fluoride) film, polyaniline film, polyimide film, non-woven fabric, polyethylene terephthalate, polystyrene (PS), cellulose, or a combination thereof. For example, the separator can be PE/PP/PE multilayer composite structure.

According to embodiments of the disclosure, the electrolyte composition can include a solvent and a lithium-containing compound. According to embodiments of the disclosure, the solvent can be organic solvent, such as ester solvent, ketone solvent, carbonate solvent, ether solvent, alkane solvent, amide solvent, or a combination thereof. According to embodiments of the disclosure, the solvent can be 1,2-diethoxyethane, 1,2-dimethoxyethane, 1,2-dibutoxyethane, tetrahydrofuran, 2-methyl tetrahydrofuran, dimethylacetamide, (DMAc), N-methyl-2-pyrrolidone (NMP), methyl acetate, ethyl acetate, methyl butyrate, ethyl butyrate, methyl propionate, ethyl propionate, propyl acetate (PA), γ-butyrolactone (GBL), ethylene carbonate (EC), propylene carbonate (PC), diethyl carbonate (DEC), ethylmethyl carbonate (EMC), dimethyl carbonate (DMC), vinylene carbonate, butylene carbonate, dipropyl carbonate, or a combination thereof. In general, when the solvent of the electrolyte composition is carbonate, the battery employing the electrolyte composition exhibits relatively high operating voltage, but the carbonate would facilitate the formation of lithium dendritic crystal on the anode, resulting in reducing the battery's performance. The anode, having the specific single-ion conductive layer, of the disclosure is able to effectively inhibit dendrite growth. Therefore, the anode of the disclosure is suitable for use in the battery employing carbonate solvent (serving as the solvent of the electrolyte composition), thereby solving the problem caused by the carbonate which serves as the solvent of the electrolyte composition.

According to embodiments of the disclosure, the lithium-containing compound can be $LiPF_6$, $LiClO_4$, LiFSI (lithium bis(fluorosulfonyl)imide), LiDFOB (lithium oxalyldifluoro borate), $LiBF_4$, $LiSO_3CF_3$, $LiN(SO_2CF_3)_2$, $LiN(SO_2CF_2CF_3)_2$, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F5SO_3$, $LiO_2CCF_3$, $LiSO_3F$, $LiB(C_6H_5)_4$, $LiB(C_2O_4)_2$(LiBOB), $LiFePO_4$, $Li_7La_3Zr_2O_{12}$, $LiLaTi_2O_6$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof. In addition, According to some embodiments of the disclosure, the electrolyte composition can include solid electrolyte. The solid electrolyte can be $LiFePO_4$, $Li_7La_3Zr_2O_{12}$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Single-Ion Conductor Polymer

Preparation Example 1

4 g of styrene-ethylene/butadiene-styrene copolymer (SEBS copolymer, sold by Sigma-Aldrich) (styrene derived repeating unit was 28 wt %) was added into a first reaction bottle, and 100 ml dichloroethane (DCE) was added into the first reaction bottle to dissolve the styrene-ethylene/butadiene-styrene copolymer. Next, the first reaction bottle was heated to 40° C. and then stirred for 1 hr. 7.6 ml of acetic anhydride was added into a second reaction bottle. Next, 2.13 ml of sulfuric acid was slowly added into the second reaction bottle at 0° C. After stirring for 1 hr, the acetic anhydride-sulfuric acid reagent was obtained. Next, the acetic anhydride-sulfuric acid reagent was slowly added into the first reaction bottle. Next, the first reaction bottle was heated to 80° C. After stirring under nitrogen atmosphere for 8 hr, a sulfonated styrene-ethylene/butadiene-styrene copolymer (SSEBS) was obtained.

Next, 4 g of sulfonated styrene-ethylene/butadiene-styrene copolymer was added into a reaction bottle, and 100 ml of dichloroethane (DCE) was added into the reaction bottle to dissolve the sulfonated styrene-ethylene/butadiene-styrene copolymer. Next, 100 ml of lithium hydroxide aqueous solution (with a concentration of 4M) was dropwisely added into the reaction bottle, and then a precipitate was observed. After filtrating and drying, the precipitate was washed with water three times at 60° C., removing the excess lithium hydroxide, obtaining lithiated and sulfonated styrene-ethylene/butadiene-styrene copolymer (1) (SSEBS-Li-40). The sulfonated styrene-ethylene/butadiene-styrene copolymer (SSEBS) and lithiated and sulfonated styrene-ethylene/butadiene-styrene copolymer (1) was analyzed by Fourier-transform infrared (FT-IR) spectroscopy. The results show that a characteristic absorption peak of SSEBS is shifted from 1730 $cm^{-1}$ to 1670 $cm^{-1}$ and the signal strength of the characteristic absorption peaks (from 1007 $cm^{-1}$ to 1184 $cm^{-1}$) of SSEBS is reduced.

The sulfonated degree (DS %) of lithiated and sulfonated styrene-ethylene/butadiene-styrene copolymer (1) (having a weight average molecular weight (Mw) of about 129,000), determined by a precise titration with a sodium hydroxide solution (with a concentration of 0.1N, dissolved in toluene and methanol) (volume ratio of toluene to methanol was 9:1), was about 40%.

Preparation Example 2

4 g of styrene-ethylene/butadiene-styrene copolymer (SEBS polymer, sold by Sigma-Aldrich) (having a weight average molecular weight (Mw) about 718,000 and a styrene derived repeating unit ratio of 28 wt %) was added into a first reaction bottle. 100 ml dichloroethane (DCE) was added into the first reaction bottle to dissolve the styrene-ethylene/butadiene-styrene copolymer. Next, the first reaction bottle was heated at 40° C. and then stirred for 1 hr. 9.5 ml of acetic anhydride was added into a second reaction bottle. Next, 2.66 ml of sulfuric acid was slowly added into the second reaction bottle at 0° C. After stirring for 1 hr, the acetic anhydride-sulfuric acid reagent was obtained. Next, the acetic anhydride-sulfuric acid reagent was slowly added into the first reaction bottle. Next, the first reaction bottle was heated to 80° C. After stirring under nitrogen atmosphere for 8 hr, sulfonated styrene-ethylene/butadiene-styrene copolymer (SSEBS) was obtained.

Next, 4 g of sulfonated styrene-ethylene/butadiene-styrene copolymer was added into a reaction bottle, and 100 ml of dichloroethane (DCE) was added into the reaction bottle to dissolve the sulfonated styrene-ethylene/butadiene-styrene copolymer. Next, 100 ml of lithium hydroxide aqueous solution (with a concentration of 4M) was dropwisely added into the reaction bottle, and then a precipitate was observed. After filtrating and drying, the precipitate was washed with water three times at 60° C., removing the excess lithium hydroxide, obtaining lithiated and sulfonated styrene-ethylene/butadiene-styrene copolymer (2) (SSEBS-Li-60). The sulfonated degree (DS %) of lithiated and sulfonated styrene-ethylene/butadiene-styrene copolymer (2) (having a weight average molecular weight (Mw) of about 134,400), determined by a precise titration with a sodium hydroxide solution (with a concentration of 0.1N, dissolved in toluene and methanol) (volume ratio of toluene to methanol was 9:1), was about 60%.

Lithium Ion Battery

Example 1

First, a copper foil (with a thickness of 12 μm) having a lithium metal layer (with a thickness of 100 μm) was provided. Next, 3.3 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of aluminum oxide ($Al_2O_3$) and 13.4 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (1) (with a thickness of about 2-3 μm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 μm), and the electrode sheet were placed in sequence (Single-ion conductive layer (1) of each electrode sheet was faced toward the separator) and sealed within an aluminum plastic pouch. The aforementioned electrolyte composition was injected into the aluminum plastic pouch, obtaining Lithium ion battery (1).

Figure 3:
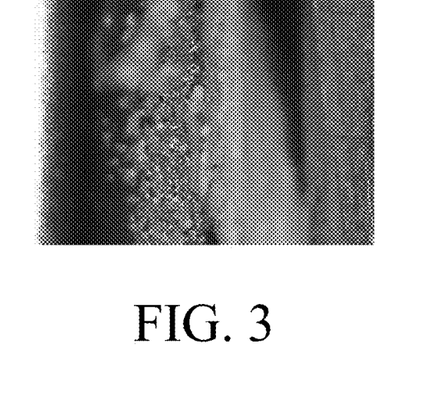
FIG. 3 is an optical microscope image of the surface of the anode of Lithium ion battery (1) as disclosed in Example 1.

Lithium ion battery (1) was subjected to a charging test, and then the lithium deposition of the battery was observed via optical microscope. The results are shown in FIG. 3.

Comparative Example 1

First, a copper foil (with a thickness of 12 μm) having a lithium metal layer (with a thickness of 100 μm) was provided, serving as the electrode sheet. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP), with a thickness of 10 μm-20 μm), and the electrode sheet were placed in sequence, and sealed within an aluminum plastic pouch. The aforementioned electrolyte composition was injected into the aluminum plastic pouch, obtaining Lithium ion battery (2).

Figure 4:
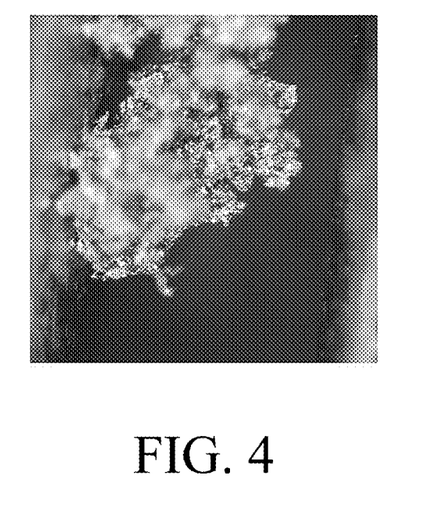
FIG. 4 is an optical microscope image of the surface of the anode of Lithium ion battery (2) as disclosed in Example 1.

Lithium ion battery (2) was subjected to a charging test, and then the lithium deposition of the battery was observed via optical microscope. The results are shown in FIG. 4.

As shown in FIG. 3, Lithium ion battery (1) having the anode of the disclosure has a dense deposited lithium layer after charging. Furthermore, due to the absence of a single-ion conductive layer of the disclosure, the Lithium ion battery (2) of Comparative Example 1 has a deposited lithium layer with a loose (i.e. mossy-like) structure (as shown in FIG. 4), thereby being unable to inhibit dendrite growth.

Figure 5:
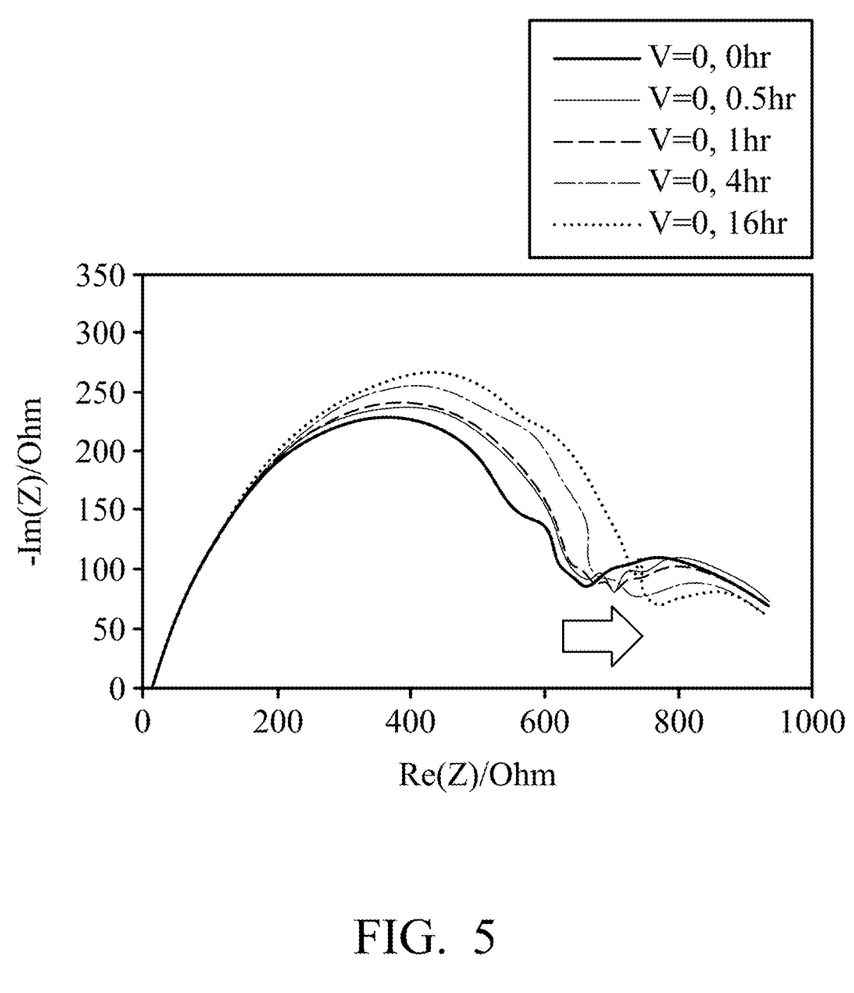
FIG. 5 shows a graph plotting surface resistance of the anode of Lithium ion battery (1) as disclosed in Example 1 against time.
Figure 6:
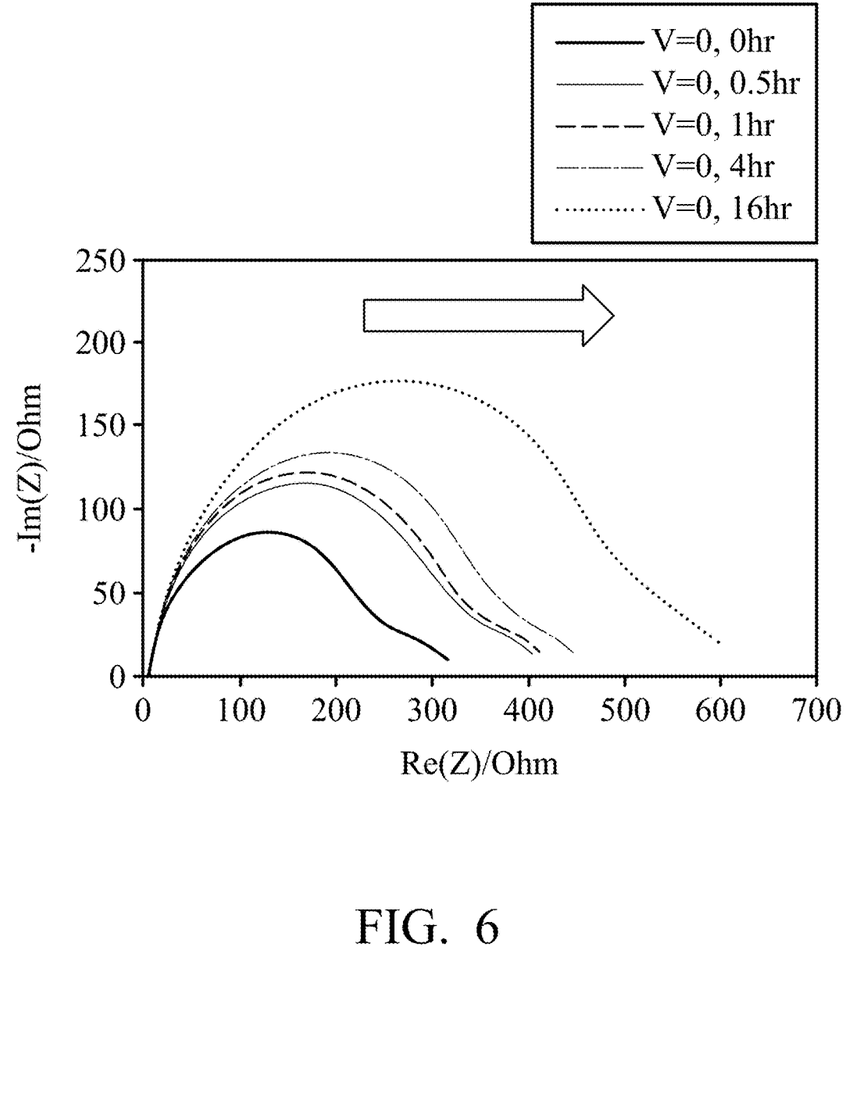
FIG. 6 shows a graph plotting surface resistance of the anode of Lithium ion battery (2) as disclosed in Comparative Example 1 against time.

The interface resistance between the electrode and the electrolyte composition against time in Lithium ion battery (1) of Example 1 was measured by impedance analyzer under an open-circuit voltage (without external bias voltage or current). The results are shown in FIG. 5. In addition, the interface resistance between the electrode and the electrolyte composition against time in Lithium ion battery (2) of Comparative Example 2 was measured by impedance analyzer under an open-circuit voltage (without external bias voltage or current). The results are shown in FIG. 6. As shown in FIGS. 5 and 6, Lithium ion battery (2) of Comparative Example 1 exhibits a great variety of surface resistance in the electrode against time. It means that the electrode surface of Lithium ion battery (2) of Comparative Example 1 exhibits a poor stability, thereby reducing the cycle stability of the battery. Furthermore, Lithium ion battery (1) of Example 1 exhibits a small variety of surface resistance in the electrode against time. It means that the electrode surface of Lithium ion battery (1) of Example 1 exhibits superior stability, thereby improving the cycle stability of the battery and enhancing the ability for protecting lithium metal.

Comparative Example 2

Comparative Example 2 was performed in the same manner as the method for preparing Lithium ion battery (1) of Example 1, except that the thickness of Single-ion conductive layer (1) of the electrode sheet was increased from 2-3 µm to about 10 µm, obtaining Lithium ion battery (3).

Comparative Example 3

Comparative Example 2 was performed in the same manner as the method for preparing Lithium ion battery (1) of Example 1, except that the thickness of Single-ion conductive layer (1) of the electrode sheet was reduced from 2-3 µm to about 1-1.5 µm, obtaining Lithium ion battery (4).

Example 2

First, a copper foil (with a thickness of 12 µm) having a lithium metal layer (with a thickness of 100 µm) was provided. Next, 2.0 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 90.0 parts by weight of aluminum oxide ($Al_2O_3$) and 8.0 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (2) (with a thickness of about 2-3 µm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 µm), and the electrode sheet were placed in sequence (Single-ion conductive layer (2) of each electrode sheet was faced toward the separator), and sealed within an aluminum plastic pouch. The aforementioned electrolyte composition was injected into the aluminum plastic pouch, obtaining Lithium ion battery (5).

Example 3

First, a copper foil (with a thickness of 12 µm) having a lithium metal layer (with a thickness of 100 µm) was provided. Next, 4.0 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 80.0 parts by weight of aluminum oxide ($Al_2O_3$) and 16.0 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (3) (with a thickness of about 2-3 µm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 µm), and the electrode sheet were placed in sequence (Single-ion conductive layer (3) of each electrode sheet was faced toward the separator), and sealed within an aluminum plastic pouch. The aforementioned electrolyte composition was injected into the aluminum plastic pouch, obtaining Lithium ion battery (6).

Example 4

First, a copper foil (with a thickness of 12 µm) having a lithium metal layer (with a thickness of 100 µm) was provided. Next, 1.7 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of aluminum oxide ($Al_2O_3$) and 15.0 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (4) (with a thickness of about 2-3 µm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 μm), and the electrode sheet were placed in sequence (Single-ion conductive layer (4) of each electrode sheet was faced toward the separator), and sealed within an aluminum plastic pouch. The aforementioned electrolyte composition was injected into the aluminum plastic pouch, obtaining Lithium ion battery (7).

Example 5

First, a copper foil (with a thickness of 12 μm) having a lithium metal layer (with a thickness of 100 μm) was provided. Next, 8.35 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of aluminum oxide ($Al_2O_3$) and 8.35 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (5) (with a thickness of about 2-3 μm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 μm), and the electrode sheet were placed in sequence (Single-ion conductive layer (5) of each electrode sheet was faced toward the separator), and sealed within an aluminum plastic pouch. The aforementioned electrolyte composition was injected into the aluminum plastic pouch, obtaining Lithium ion battery (8).

Figure 7:
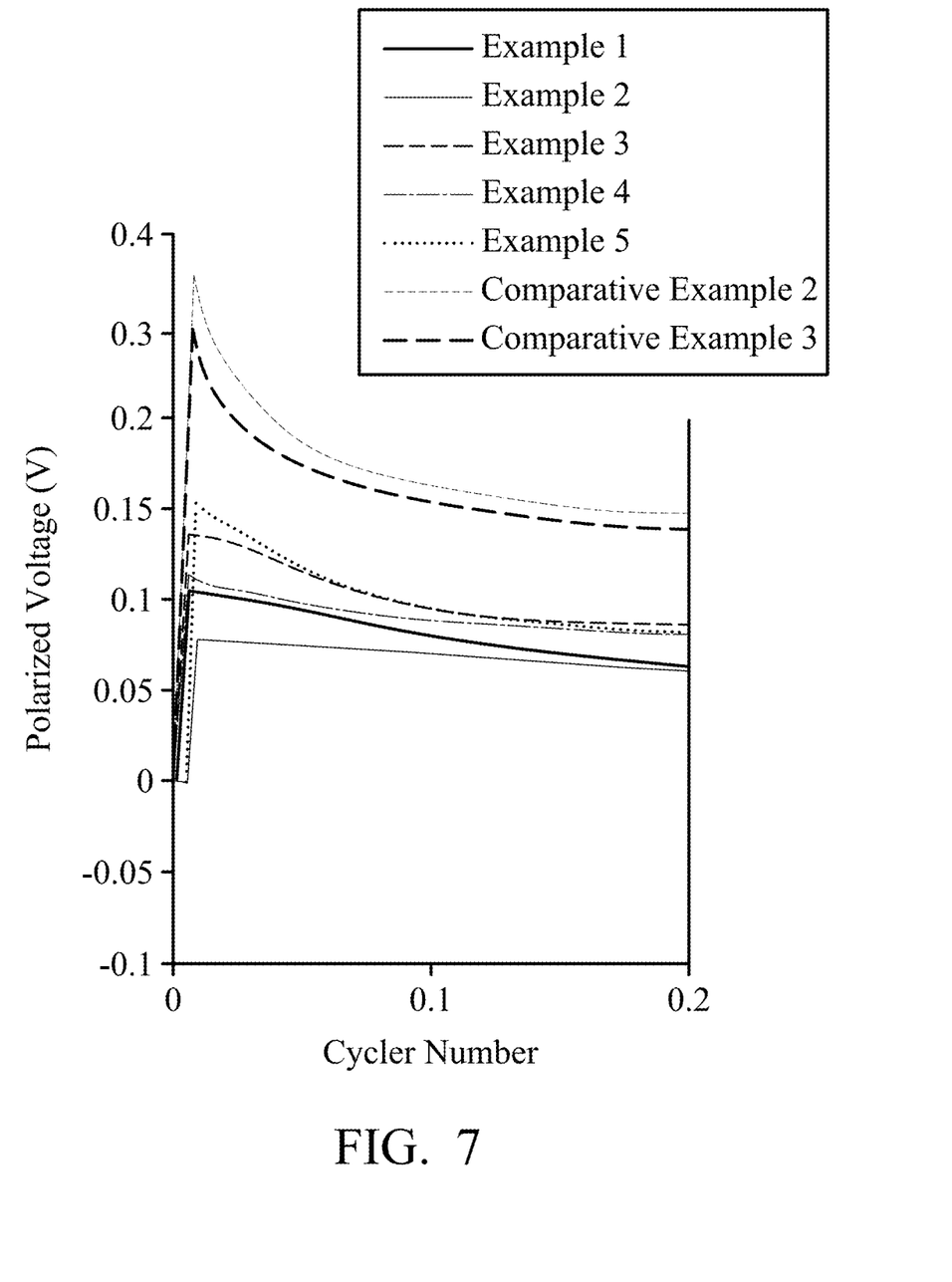
FIG. 7 shows a graph plotting charging polarization voltage of the lithium ion batteries as disclosed in Examples 1-5 and Comparative Examples 2-3.
Figure 8:
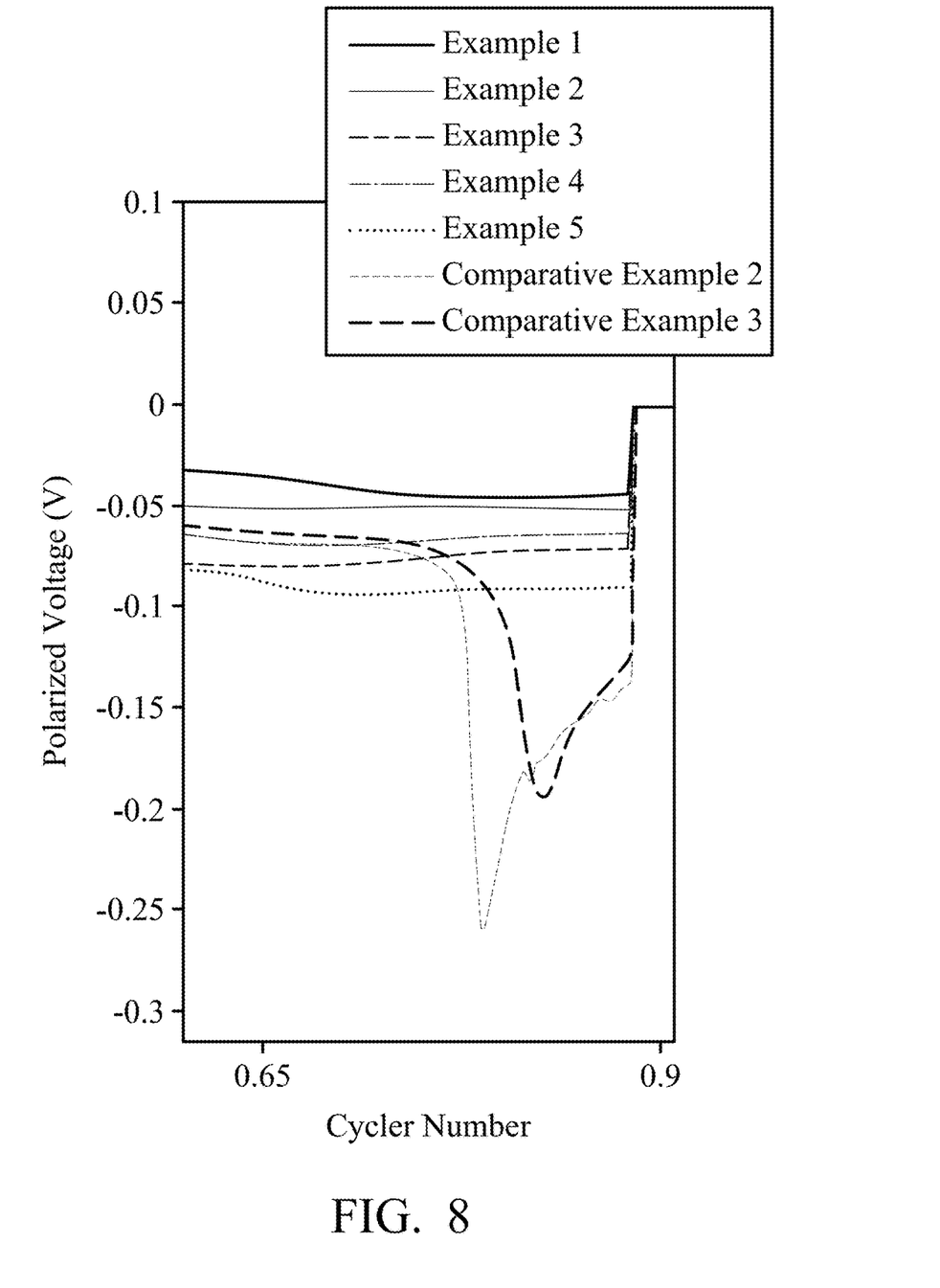
FIG. 8 shows a graph plotting discharging polarization voltage of the lithium ion batteries as disclosed in Examples 1-5 and Comparative Examples 2-3.

Lithium ion battery (1) of Example 1, Lithium ion battery (3) and (4) of Comparative Examples 2 and 3, and Lithium ion battery (5)-(8) of Examples 2-5 were subjected to an over-voltage charging-discharging test at 0.5 mAh to determine the over-voltage in nucleation site and the over-voltage for stable deposition. The results are shown in FIGS. 7 and 8. As shown in FIGS. 7 and 8, when the thickness of the single-ion conductive layer is too high (greater than 6 μm) or too low (less than 2 μm), the over-voltage in nucleation site and the over-voltage for stable deposition of the battery would be increased, resulting from that lithium is deposited along a single direction thereby facilitating dendritic growth. In addition, as shown in FIGS. 7 and 8, when the weight ratio of the binder to the single-ion conductor polymer is within a range from 1:1 to 9:1 and the weight ratio of the inorganic particle to the total weight of the single-ion conductor polymer and the binder is within a range from 4:1 to 9:1, the over-voltage in nucleation site and the over-voltage for stable deposition of the battery would be stable, resulting from that lithium is deposited along different directions thereby inhibiting dendritic growth.

Example 6

First, a copper foil (with a thickness of 12 μm) having a lithium metal layer (with a thickness of 100 μm) was provided. Next, 3.3 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of ZnO and 13.4 parts by weight of poly(vinylidene fluoride-co-hexafluoropropene) (PVDF-HFP) (sold by Sigma-Aldrich, with a weight average molecular weight (Mw) of about 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an electrode sheet having Single-ion conductive layer (6) (with a thickness of about 2-3 μm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 μm), and the electrode sheet were placed in sequence (Single-ion conductive layer (6) of each electrode sheet was faced toward the separator), and sealed within an aluminum plastic pouch. The aforementioned electrolyte composition was injected into the aluminum plastic pouch, obtaining Lithium ion battery (9).

Example 7

First, a copper foil (with a thickness of 12 μm) having a lithium metal layer (with a thickness of 100 μm) was provided. Next, 3.3 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of aluminum oxide ($Al_2O_3$) and 13.4 parts by weight of polyvinylfluoride (PVF) (sold by Sigma-Aldrich, with a weight average molecular weight (Mw) of about 186,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, electrode sheet having Single-ion conductive layer (7) (with a thickness of about 2-3 μm) was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the electrode sheet, a separator (polypropylene/polyethylene/polypropylene (PP/PE/PP) with a thickness of about 10-20 μm), and the electrode sheet were placed in sequence (Single-ion conductive layer (7) of each electrode sheet was faced toward the separator), and sealed within an aluminum plastic pouch. The aforementioned electrolyte composition was injected into the aluminum plastic pouch, obtaining Lithium ion battery (10).

Example 8

First, a copper foil (with a thickness of 12 μm) having a lithium metal layer (with a thickness of 20 μm) was provided. Next, 3.3 parts by weight of lithiated and sulfonated styrene-ethylene/butadiene-styrene copolymer (2) of Preparation Example 2 was dissolved in tetrahydrofuran (THF), obtaining a first solution (with a solid content of 5 wt %). Next, 83.3 parts by weight of aluminum oxide ($Al_2O_3$) and 13.4 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a second solution (with a solid content of 20 wt %). Next, the first solution was mixed with the second solution, and the mixture was coated on the lithium metal layer by solvent casting. After baking at 70° C. for 30 min, an anode having Single-ion conductive layer (1) (with a thickness of about 2-3 μm) was obtained. Next, $LiCoO_2$, poly(vinylidene fluoride-co-hexafluoropropene) (PVDF-HFP), and conductive carbon (sold by china steel chemical corporation) (91.3 wt %: 5 wt %: 3.7 wt %) were mixed and dissolved in N-methylpyrrolidone (NMP), serving a cathode coating composition. Next, the cathode coating composition was coated on an aluminum foil (with a thickness of about 15 μm) by a blade with a fixed interval. After drying at 110° C. for about 8 hr and rolling by the rolling mill, a cathode was obtained. Next, $LiPF_6$ (lithium salt) was mixed with diethyl carbonate (DEC), obtaining a solution (with a concentration of 1.1M). Next, LiDFOB (lithium oxalyldifluoro borate) was added into the solution (the concentration of LiDFOB was 2 wt %, based on the weight of the solution), obtaining an electrolyte composition. Next, the anode (Single-ion conductive layer (1) of the anode was faced toward the separator), a separator (polypropylene/polyethylene/polypropylene (PP/PE/PP) with a thickness of about 10-20 μm), and the cathode were placed in sequence, and sealed within an aluminum plastic pouch. The aforementioned electrolyte composition was injected into the aluminum plastic pouch, obtaining Lithium ion battery (11).

Comparative Example 4

First, a copper foil (with a thickness of 12 μm) having a lithium metal layer (with a thickness of 20 μm) was provided, serving as an anode. Next, the anode, a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (12).

Comparative Example 5

First, a copper foil (with a thickness of 12 μm) having a lithium metal layer (with a thickness of 20 μm) was provided. Next, 83.3 parts by weight of aluminum oxide ($Al_2O_3$) and 16.7 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 20 wt %). Next, the solution was coated on the lithium metal layer by solvent casting. After baking at 70° C. for 30 min, an anode having Layer (1) (with a thickness of about 2-4 μm) was obtained. Next, the anode (Layer (1) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (13).

Comparative Example 6

First, a copper foil (with a thickness of 12 μm) having a lithium metal layer (with a thickness of 20 μm) was provided. Next, 50 parts by weight of aluminum oxide ($Al_2O_3$) and 50 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 20 wt %). Next, the solution was coated on the lithium metal layer by solvent casting. After baking at 70° C. for 30 min, an anode having Layer (2) (with a thickness of about 2-4 μm) was obtained. Next, the anode (Layer (2) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (14).

Comparative Example 7

First, a copper foil (with a thickness of 12 μm) having a lithium metal layer (with a thickness of 20 μm) was provided. Next, 80 parts by weight of aluminum oxide ($Al_2O_3$) and 20 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 20 wt %). Next, the solution was coated on the lithium metal layer by solvent casting. After baking at 70° C. for 30 min, an anode having Layer (3) (with a thickness of about 2-4 μm) was obtained. Next, the anode (Layer (3) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (15).

Comparative Example 8

First, a copper foil (with a thickness of 12 μm) having a lithium metal layer (with a thickness of 20 μm) was provided. Next, 90 parts by weight of aluminum oxide ($Al_2O_3$) and 10 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 20 wt %). Next, the solution was coated on the lithium metal layer by solvent casting. After baking at 70° C. for 30 min, an anode having Layer (4) (with a thickness of about 2-4 μm) was obtained. Next, the anode (Layer (4) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (16).

Comparative Example 9

First, a copper foil (with a thickness of 12 μm) having a lithium metal layer (with a thickness of 20 μm) was provided. Next, poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 5 wt %). Next, the solution was coated on the lithium metal layer by solvent casting. After baking at 70° C. for 30 min, an anode having Layer (5) (with a thickness of about 2-4 μm) was obtained. Next, the anode (Layer (5) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (17).

The average Young's modulus and shear modulus of Single-ion conductive layer (1) of Example 8 and Layer (5) (consisting of PVDF-HFP) of Comparative Example 9 were measured. The results are shown in Table 1

TABLE 1

| Component | | average Young's modulus | average shear modulus |
|---|---|---|---|
| Single-ion conductive layer (1) of Example 8 | SSEBS-Li-60 (3.3%)/ Al$_2$O$_3$ (83.3%)/ PVDF-HFP (13.4%) | 14 GPa | 5.26 GPa |
| Layer (5) of Comparative Example 9 | PVDF-HFP (100%) | 0.5 GPa | 0.19 GPa |

As shown in Table 1, the single-ion conductive layer of the disclosure exhibits sufficient mechanical strength and achieves high lithium conversion, due to the specific components (such as inorganic particle, single-ion conductor polymer, and binder) and amounts. Therefore, the single-ion conductive layer of the disclosure can avoid the deposited lithium passing through the single-ion conductive layer and inhibit dendrite growth.

Comparative Example 10

First, a copper foil (with a thickness of 12 μm) having a lithium metal layer (with a thickness of 20 μm) was provided. Next, 83.3 parts by weight of aluminum oxide (Al$_2$O$_3$) and 16.7 parts by weight of poly(vinylidene fluoride-co-hexafluoropropene) (PVDF-HFP) (sold by Sigma-Aldrich, with a weight average molecular weight (Mw) of 400,000) were dissolved in dimethyl ether, obtaining a solution (with a solid content of 20 wt %). Next, the solution was coated on the lithium metal layer by solvent casting. After baking at 70° C. for 30 min, an electrode sheet having Layer (1) (with a thickness of about 2-4 μm) was obtained. Next, lithiated and sulfonated styrene-ethylene/butadiene-styrene copolymer (2) of Preparation Example 2 was dissolved in tetrahydrofuran (THF), obtaining a solution (with a solid content of 5 wt %). The solution was coated on Layer (1) by solvent casting. After baking at 70° C. for 30 min, an anode having Polymer layer (1) (with a thickness of about 2 μm)/Layer (1) was obtained. Next, the anode (Polymer layer (1) of the anode was faced toward the separator), a separator (polypropylene/polyethylene/polypropylene (PP/PE/PP) with a thickness of about 10-20 μm), and the cathode of Example 8 were placed in sequence, and sealed within an aluminum plastic pouch. The electrolyte composition of Example 8 was injected into the aluminum plastic pouch, obtaining Lithium ion battery (18).

Coulombic efficiency and charging-discharging capacity (at various charging-discharging cycles) of Lithium ion battery (11) of Example 8, Lithium ion battery (12) of Comparative Example 4, Lithium ion battery (13) of Comparative Example 5, Lithium ion battery (17) of Comparative Example 9, and Lithium ion battery (18) of Comparative Example 10 were measured at 0.1C charging rate and 0.5C discharging rate. The results are shown in Table 2.

TABLE 2

| cycle | lithium ion battery | discharge capacity (mAh) | Coulombic efficiency (%) |
|---|---|---|---|
| 3 | lithium ion battery (11) | 171.6 | 96.6 |
|  | lithium ion battery (12) | 163.2 | 90.7 |
|  | lithium ion battery (13) | 167.2 | 95.8 |
|  | lithium ion battery (17) | 164.7 | 93.5 |
|  | lithium ion battery (18) | 145.6 | 82.6 |
| 5 | lithium ion battery (11) | 172.1 | 98.6 |
|  | lithium ion battery (12) | 168.6 | 95.3 |
|  | lithium ion battery (13) | 168.0 | 97.8 |
|  | lithium ion battery (17) | 163.7 | 95.5 |
|  | lithium ion battery (18) | 142.2 | 95.2 |
| 30 | lithium ion battery (11) | 156.0 | 98.2 |
|  | lithium ion battery (12) | 109.5 | 92.8 |
|  | lithium ion battery (13) | 152.0 | 95.1 |
|  | lithium ion battery (17) | 145.9 | 94.9 |
|  | lithium ion battery (18) | 55.0 | 82.3 |

As shown in Table 2, in comparison with the lithium ion battery without the single-ion conductive layer of the disclosure, the lithium ion battery of the disclosure exhibits high discharge capacity and Coulombic efficiency. Accordingly, the anode, having the single-ion conductive layer, of the disclosure can effectively inhibit dendrite growth, thereby obtaining a smooth deposited lithium layer. As a result, the battery employing the anode can exhibit improved discharge capacity, Coulombic efficiency, and cycle life.

It will be clear that various modifications and variations can be made to the disclosed methods and materials. It is intended that the specification and examples be considered as exemplary only, with the true scope of the disclosure being indicated by the following claims and their equivalents.

What is claimed is:
1. An anode, comprising:
 a lithium-containing layer; and
 a single-ion conductive layer disposed on the lithium-containing layer, wherein the single-ion conductive layer comprises an inorganic particle, a single-ion conductor polymer, and a binder, wherein the single-ion conductor polymer has a first repeat unit of Formula (I), a second repeat unit of Formula (II), a third repeat unit of Formula (III), and a fourth repeat unit of Formula (IV)

Formula (I)

Formula (II)

Formula (III)

Formula (IV)

wherein $R^1$ is $O^-M^+$, $SO_3^-M^+$, $N(SO_2F)^-M^+$, $N(SO_2CF_3)^-M^+$, $N(SO_2CF_2CF_3)^-M^+$, $COO^-M^+$, or $PO4^-M^+$; $M^+$ is $Li^+$, $Na^+$, $K^+$, $Cs^+$, or a combination thereof; and $R^2$ is $CH_3$, $CH_2CH_3$, or $CH_2CH_2OCH_2CH_3$, and wherein the weight ratio of the inorganic particle to the sum of the single-ion conductor polymer and the binder is from 4:1 to 9:1, and the weight ratio of the binder to the single-ion conductor polymer is from 1:1 to 9:1.

2. The anode as claimed in claim 1, wherein the ratio of the amount of fourth repeating units to the total amount of first repeating units and fourth repeating units is from 0.3 to 0.7.

3. The anode as claimed in claim 1, wherein the weight ratio of the sum of the first repeating unit and the fourth repeating unit to the single-ion conductor polymer is from 0.2 to 0.5.

4. The anode as claimed in claim 1, wherein the lithium-containing layer is a lithium layer or a lithium-containing compound layer.

5. The anode as claimed in claim 1, wherein the inorganic particle is aluminium oxide ($Al_2O_3$), zinc oxide (ZnO), silicon oxide ($SiO_2$), copper nitride ($Cu_3N$), lithium carbonate ($Li_2CO_3$), or a combination thereof.

6. The anode as claimed in claim 1, wherein the binder is polyvinylidene difluoride (PVDF), poly(vinylidene fluoride-co-hexafluoropropene) (PVDF-HFP), polyvinylfluoride (PVF), styrene-butadiene rubber (SBR), nitrile-butadiene rubber (NBR), or a combination thereof.

7. The anode as claimed in claim 1, wherein the single-ion conductive layer has a thickness from 2 µm to 6 µm.

8. The anode as claimed in claim 1, wherein the single-ion conductive layer is directly disposed on the lithium-containing layer.

9. The anode as claimed in claim 1, wherein the fourth repeating unit is wherein $R^1$ is $O^-M^+$, $SO_3^-M^+$, $N(SO_2F)^-M^+$, $N(SO_2CF_3)^-M^+$, $N(SO_2CF_2CF_3)^-M^+$, $COO^-M^+$, or $PO4^-M^+$; and $M^+$ is $Li^+$, $Na^+$, $K^+$, $Cs^+$, or a combination thereof.

10. A lithium ion battery, comprising:
a cathode;
a separator;
the anode as claimed in claim 1, wherein the anode and the cathode are separated from each other by the separator; and
an electrolyte composition disposed between the cathode and the anode.

* * * * *